United States Patent [19]

Louët Feisser, Arnold et al.

[11] Patent Number: 4,838,013

[45] Date of Patent: Jun. 13, 1989

[54] MOWING MACHINE

[75] Inventors: Louët Feisser, Arnold, Riel; Koorn, Maarten, Vlaardingen; Sape Sikkema, Maassluis, all of Netherlands

[73] Assignee: C. van der Lely, N.V., Maasland, Netherlands

[21] Appl. No.: 119,384

[22] Filed: Nov. 10, 1987

[30] Foreign Application Priority Data

Nov. 12, 1986 [NL] Netherlands ............... 8602866

[51] Int. Cl.⁴ ................................. A01D 34/66
[52] U.S. Cl. ................................ 56/13.6; 56/15.8; 56/208
[58] Field of Search ............ 56/15.5, 15.7, 15.8, 56/14.9, 13.6, 6, 208

[56] References Cited

U.S. PATENT DOCUMENTS

| | | | |
|---|---|---|---|
| 3,088,263 | 5/1963 | Thompson | 56/15.5 |
| 3,672,132 | 6/1972 | Scarnato et al. | 56/1 |
| 3,958,399 | 5/1976 | Schoernberger | 56/15.8 |
| 4,081,946 | 4/1978 | Ehrhart | 56/15.8 |
| 4,206,582 | 6/1980 | Molzahn et al. | 56/15.8 |
| 4,573,309 | 3/1986 | Patterson | 56/14.9 |
| 4,676,053 | 6/1987 | Pruitt | 56/15.5 |
| 4,723,401 | 2/1988 | Webster et al. | 56/15.5 |
| 4,724,661 | 2/1988 | Blakeslee et al. | 56/15.8 |

FOREIGN PATENT DOCUMENTS

| | | |
|---|---|---|
| 0009134 | 4/1980 | European Pat. Off. . |
| 0065809 | 12/1982 | European Pat. Off. . |
| 0118952 | 9/1984 | European Pat. Off. . |
| 1782761 | 10/1972 | Fed. Rep. of Germany . |
| 2349176 | 4/1975 | Fed. Rep. of Germany ....... 56/15.5 |
| 2172628 | 9/1973 | France . |
| 2560484 | 9/1985 | France . |
| 7805731 | 11/1979 | Netherlands . |
| 2053645 | 2/1981 | United Kingdom . |

*Primary Examiner*—Paul J. Hirsch
*Attorney, Agent, or Firm*—Robert A. Miller; Penrose L. Albright

[57] ABSTRACT

A mowing machine having a mobile frame, made up of a portion including the mower units and a support frame, which can be coupled by means of a pivotal arm to a prime mover. During operation, the mobile frame is located behind and offset to one side of the prime mover. The pivotal arm carries drive means for driving the mowing machine through the PTO-shaft of the prime mover. The pivotal arm is constructed so that it may pivot over a broad range of angles thereby facilitating turns. To accomodate the construction of the pivotable arm, the drive means may be divided into three sections interconnected by two universal joints.

34 Claims, 10 Drawing Sheets

MOWING MACHINE

BACKGROUND OF THE INVENTION

The invention relates to a mowing machine comprising a first frame having accommodated therein a mowing unit with a supporting beam and a plurality of mower members. The mower members are rotatable about substantially upwardly directed axes. Drive means for each mower member is provided within the supporting beam which extends during operation, substantially transversely to the direction of operative travel. The first frame also includes a processing member that is rotatable about a substantially horizontal axis and extends through a large part of the width of said mowing unit. In spite of its relatively heavy weight and its often large width, such a mowing machine should effectively follow the surface of the soil during moving operations.

SUMMARY OF THE INVENTION

The invention has for its object to provide an advantageous construction, in which the mowing unit may be moved over the surface of the ground in an effective manner.

According to the invention, the first frame is movably suspended in a second frame connected to a vehicle. The first frame has an upwardly directed force exerted on it by a spring which is attached at one end to the second frame and at its other end to a tilting element which is rotatably connected to that second frame. A tensile member attaches the tilting element to second frame so that, when the spring is tensioned or slackened, an approximately equal upwardly directed force is exerted on the first frame. In accordance with the invention, the tilting element may be connected rotatably to the second frame and the spring may be a helical spring, in particular, a tensile spring. The use of this construction will be described in further detail in the description of the drawings.

In accordance with a further feature of the invention, the second frame is fitted with swath guides which are located behind the crop processing member and extend rearwardly and inwardly at an adjustable angle. By mounting these swath or crop guides on the second frame, the first frame, which follows the surface of the soil, can be of a lighter construction. In accordance with the invention, the crop guide may predominantly consist of a substantially vertical portion and on obliquely downwardly directed portion.

In addition, the second frame may be provided with two ground wheels, each of which can be lowered relative to the second frame by means of a hydraulic cylinder. Located between the hydraulic supply line common to the two cylinders and the cylinders is a flow divider which feeds both cylinders with substantially equal quantities of hydraulic fluid, independent of the pressure in the cylinders. By lowering the wheels relative to the second frame, the mowing implement can be brought into a transport position, the distance between the mowing unit and the soil being increased significantly. When the second frame portion partially bears on a vehicle which is not directly in front of the mowing implement but at an angle to the rear, the width carrier by each of the wheels is different. The use of the flow divider can then enable an upward movement to the mowing unit to prevent a tilt.

Additionally, in accordance with the invention, the first frame may be connected to the second frame by a plurality of pivotal members which are pivotally attached to both the first and the second frame, at least one lower pivotal member being arranged forwardly and obliquely upwardly from the second frame. This arrangement permits advantageous movement of the first frame relative to the second frame, because, upon the upward movement of the first frame relative to the second, the bottom part of the first frame will also move somewhat to the rear. This will be set out in further detail with reference to the embodiments of the invention.

Further, in accordance with the invention, at least one superjacent pivotal member may be adjustable in length or the slope of at least one superjacent pivotal member may be adjustable, since for that pivotal member a plurality of attachment points are provided one above the other in the first and/or the second frame.

In accordance with a further feature of the invention, the second frame may be provided with ground wheels and said second frame may be connected to the vehicle by means of a pivotal arm, the angle, projected in a horizontal plane, between the pivotal arm and the second frame being adjustable by means of a hydraulic cylinder which has one end attached to the pivotal arm and the other end to the second frame. As a result, the pivotal arm may be pivoted towards a transport position, the end of the pivotal arm facing away from the second frame being located approximately directly in front of the second frame. In this position, it is possible for the hydraulic cylinder to be locked mechanically by means of a locking element which is operable from the vehicle by means of a rope.

The invention also relates to a mowing machine including a mobile frame which can be coupled by means of a pivotal arm to a tractor or a suchlike vehicle, which frame, during operation, is offset to the rear at an oblique angle, from the vehicle, the pivotal arm being provided with drive means. In this case, a belt transmission may be attached to the pivotal arm, the belt transmission being located in a substantially horizontal plane extending, during operation, substantially transversely to the direction of operative travel. The incoming drive wheel of the belt transmission is connected through an intermediate shaft to a bearing at the end of the pivotal arm facing away from the frame and the outgoing drive wheel is connected by means of an intermediate shaft to a bearing on or near the frame.

In accordance with a further feature of the invention, the pivotal arm may be provided with two portions which are movable relative to each other and are interconnected by hinges having substantially vertical pins. The projections of four hinges on a horizontal plane constitute the vertices of a quadrangle having equal diagonals. The quadrangle is deformable, although the diagonals remain constant and there are two equal facing sides. The drive means include two universal joints which are provided in such a position such that their projections on the horizontal plane are located near the respective center of the equal sides. Thus, there is obtained between the two portions of the pivotal arm a pivotability which is comparatively great. As the drive shaft is substantially divided into three sections which, relative to each other, pairwise enclose equal angles and whose lengths change only to a limited degree during pivoting. In that situation, in accordance with the invention, the projections of the centers of the universal joints are substantially located on the mean perpendiculars of the equal sides, i.e. each outside the projection of the quadrangle. In this manner the change in length of the drive shaft sections is minimized.

Additionally, in accordance with the invention, the pivotal arm may be provided with a portion which is pivotally attached by a vertical pin to the frame and at its end away from the frame includes a transversely extending portion. Near the ends of the transverse portion are hinges whose projections on a horizontal plane constitute two vertices, interspaced by a fixed distance, of the quadrangle. The pivotal arm is further provided with a section to be connected to a tractor or other prime mower. This section is also provided with a transversely extending portion, near the ends of which are hinges, whose projections on that horizontal plane constitute the two other vertices, interspaced by a fixed distance, of the quadrangle. The hinges are located crosswise, relative to each other, are interconnected by a connecting beam which is capable of pivoting only in one plane relative to the sections of the pivotal arm and the two other hinges are interconnected by a connecting rod which is capable of moving in more than one plane relative to each of the sections of the pivotal arm. The length of this connecting rod may, optionally, be adjustable. This construction will be set out in further detail with reference to an embodiment of the invention.

In accordance with a further feature of the invention, the implement may be driven from the vehicle by a gear wheel transmission having a transmission ratio of approximately 1.36:1. It is possible to alter this gear transmission by interchanging the primary and secondary gear wheels to obtain a transmission ratio of approximately 0.735:1. The gear wheel transmission may be accommodated in a gear box which can be mounted in two positions, permitting the incoming and the outgoing shafts to be interchanged. Further, the gear transmission may be mounted near the end of the pivotal arm facing away from the frame and connecting the frame to a tractor or other prime mower. Thus, it is possible to keep the rotational speed of the drive shaft in the region of the pivotal shaft nearly constant at approximately 735 revolutions per minute, the gear transmission being adjusted, based upon the number of revolutions of the power take-off shaft of the tractor or other prime mover (540 or 1000 revolutions per minute).

Furthermore, in accordance with the invention, the first frame, having accommodated therein the mowing unit and the crop processing implement, may be provided with a drive which is driven from the vehicle and drives the mowing unit as well as the crop processing implement. In accordance with the invention, the crop processing implement may be driven by means of a shear pin coupling. The shear pin coupling can disconnect the drive of the crop processing implement when the implement is blocked or when the mowing unit is blocked. By disconnecting the mass of the crop processing implement from that of the mowing unit in case of blockage, less severe damage will result.

In accordance with a further feature of the invention, the drive may be provided by a main draft shaft, located above the mowing unit and extending transversely to the direction of operative travel, for the mowing unit. The main drive shaft is driven from the vehicle and is provided at one end with a first flange against which a coaxially rotating second flange bears, the second flange being drivably connected to the crop processing implement. The first and second flanges are intercoupled by means of a shear pin and are accessible from the side of the implement after removal of a cover.

A further feature of the invention has the crop processing implement being driven by means of gear wheels, at least two of which are exchangeable for other gear wheels in order to obtain a different rotational speed of the crop processing implement. The exchangeable gear wheels may be provided at the side of the implement and be covered by a removable cover. Thus, depending on the type of crop to be mown and its condition, the speed of rotation of the crop processing implement can be set, so that the beating operation to be performed on the crop can be adapted as required.

Additionally, in accordance with the invention, there may be provided screening means extending forwardly and laterally from the implement which include screening hoods that may be folded upwardly by means of hinges about a horizontal shaft located near the implement. At the side of the implement receiving the drive, it may be necessary to have a laterally extending screening hood connected to a portion of the forwardly extending screening means, so that, when the laterally extending screening hood is folded upwardly about a substantially horizontal shaft extending in the direction of operative travel, the portion of the screening hood present in front of the implement is folded downwardly. The portion of the screening hood that is located below the point where the drive shaft is connected to the frame, which makes an upward movement of the screening hood impossible, is therefore moved in a downward direction.

In accordance with a further feature of the invention, the moving unit may include a supporting beam having substantially oval mower members provided rotatably thereon, each mower member being provided with two knives. Adjacent mower members rotate in opposite directions, as do the outermost mower members, i.e. from the front side inwardly to the rear. The outside dimensions of the mowing unit, when all the mower members are directed such that the long shaft of the oval disc is directed forwardly and laterally at an angle of approximately 45°, is approximately three meters. This renders transport of the implement by public road permissible, although the operating range of the machine is considerably more than three meters.

The invention further relates to a mowing machine comprising a frame, including a drive and a supporting beam, having a plurality of mower members which are rotatable about substantially upwardly directed axes. The mower member's drive means is provided within the supporting beam, which during operation, extends substantially transversely to the direction of operative travel. The mowing machine, according to the invention, is characterized in that the drive means are driven by the drive near the two ends of the supporting beam. In this situation, in accordance with the invention, a main drive shaft may extend above the supporting beam in the frame, which main drive shaft near its end drives, by means of gear wheels, secondary drive shafts which are substantially positioned at a right angle to the main drive shaft. The secondary drive shafts are connected to the outermost mower members. By thus driving the outermost mower members, it is possible for the drive shafts to be mounted within the crop guide drums provided on the outermost mower members.

Also, in accordance with the invention, at least one outermost mower member may be driven by a drive shaft located within a substantially drum-shaped crop guide on said mower member, the drive shaft having two interspaced single universal joints. The crop guide being connected to that section of the drive shaft located between the universal joints. In this respect, the notion "drum" must be interpreted in a broad sense as it may have a shape other than a cylinder and be provided, on its surface, with means for gripping the crop.

In addition, in accordance with the invention, the mowing unit may include a supporting beam connected to the frame by two shafts, each of which is attached to a mower member and rotates along therewith, with at least one of the shaft driving the mower members. Thus, when the drive shafts are adequately supported by bearings, the supporting beams with mower members may be connected to the frame without the need for further connecting members between the supporting beam and the frame. This is an advantage since further connecting members might adversely affect working the crop. According to the invention, the two shafts may be connected to the two outermost mower members.

In accordance with a further feature of the invention, all the mower members may be interconnected by means of a torsion shaft located in the supporting beam and extending substantially through the entire length thereof. The torsion shaft, for driving each mower member, is provided, in the supporting beam, with a gear wheel located below the relevent mower member. In accordance with a further feature of the invention, the torsion shaft may have an out-of-round cross-section and the gear wheels may be provided with a centerhole having a complementary out-of-round shape, so that the relevent gear wheels can be placed tightly on the torsion shaft and are rigid during rotation. Furthermore, in accordance with the invention, the torsion shaft may be removed from the supporting beam by axial displacement while the gear wheels are left in the supporting beam.

In accordance with a further feature of the invention, the supporting beam may be assembled from sections arranged next to and against each other in the longitudinal direction of the supporting beam, a number of which sections including drive means for the mower members. In this case, in accordance with the invention, the sections can be retained by means of a tensile rod passing through all of them. Both, the tensile rod and the torsion shaft, extending parallel thereto, extend through the sections of the supporting beam and can be removed by sliding in the longitudinal direction of the supporting beam. By so doing, the sections of the supporting beam are detachable and separately replaceable. In implements of this type it is of the utmost importance that operability is not reduced by extensive repair time. In the manner described above, it is possible, in the case of damage to sections of the moving unit, to exchange separate sections in a rapid and effective manner.

For a better understanding of the invention and to show how the same may be carried into effect, reference will now be made, by way of example, to the accompanying drawings of some embodiments of the mowing implement.

DESCRIPTION OF THE PREFERRED EMBODIMENTS

In the various drawings, which give only a schematic rendering of the implement, corresponding component parts have been given the same reference numerals.

Figure 1:
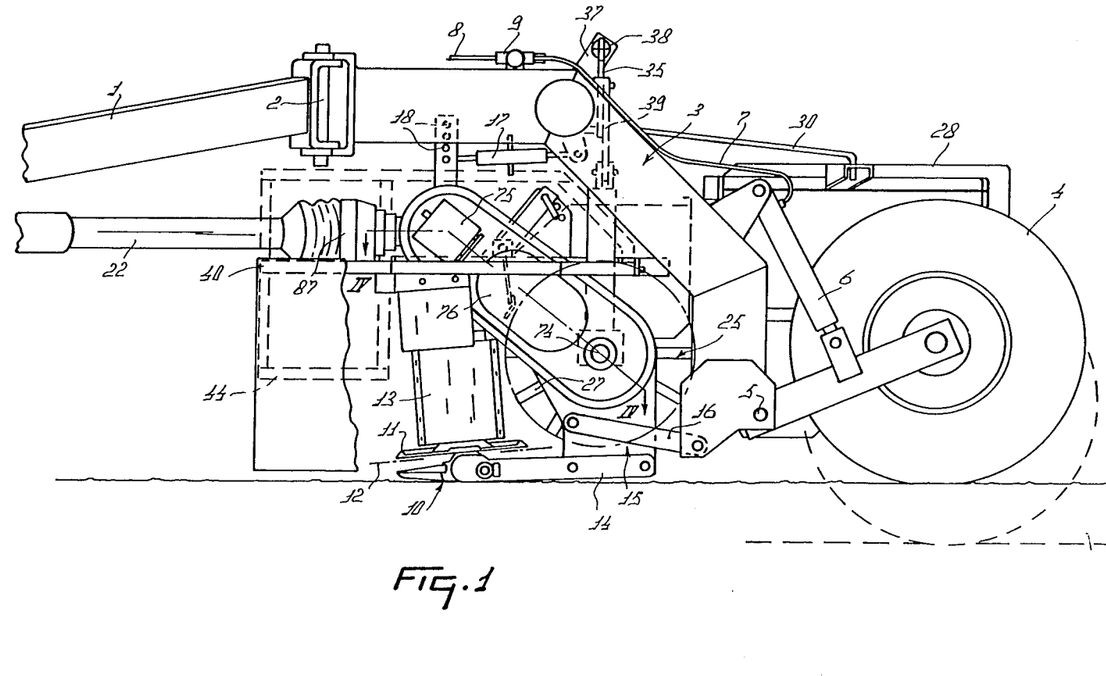
FIG. 1 is a side view of a mowing machine.

FIG. 1 is a side view of a mowing machine provided with a pivotal arm 1 by which the mowing machine can be connected to a tractor or similar vehicle. Hinge 2 connects pivotal arm 1 to the second frame 3 which is movably supported by wheels 4 which are pivotally connected by means of pivots 5 to said second frame 3. The pivotal movement of each of the wheels 4, relative to the second frame 3, is effected by means of the hydraulic cylinder 6, whose length can be adjusted by means of the supply and discharge of a fluid through line 7. The hydraulic fluid is supplied from the vehicle, pulling the machine, through line 8. After the fluid passes through a flow divider 9, which provides each of the hydraulic cylinders 6 with equal quantities of fluid, the wheels 4 are pivoted to an equal extent relative to the second frame 3. This is of importance when the vehicle pulling the mowing machine is not situated directly in front thereof, thus causing the weight distribution of the mowing machine over the two wheels 4 to be non-uniform.

Figure 2:
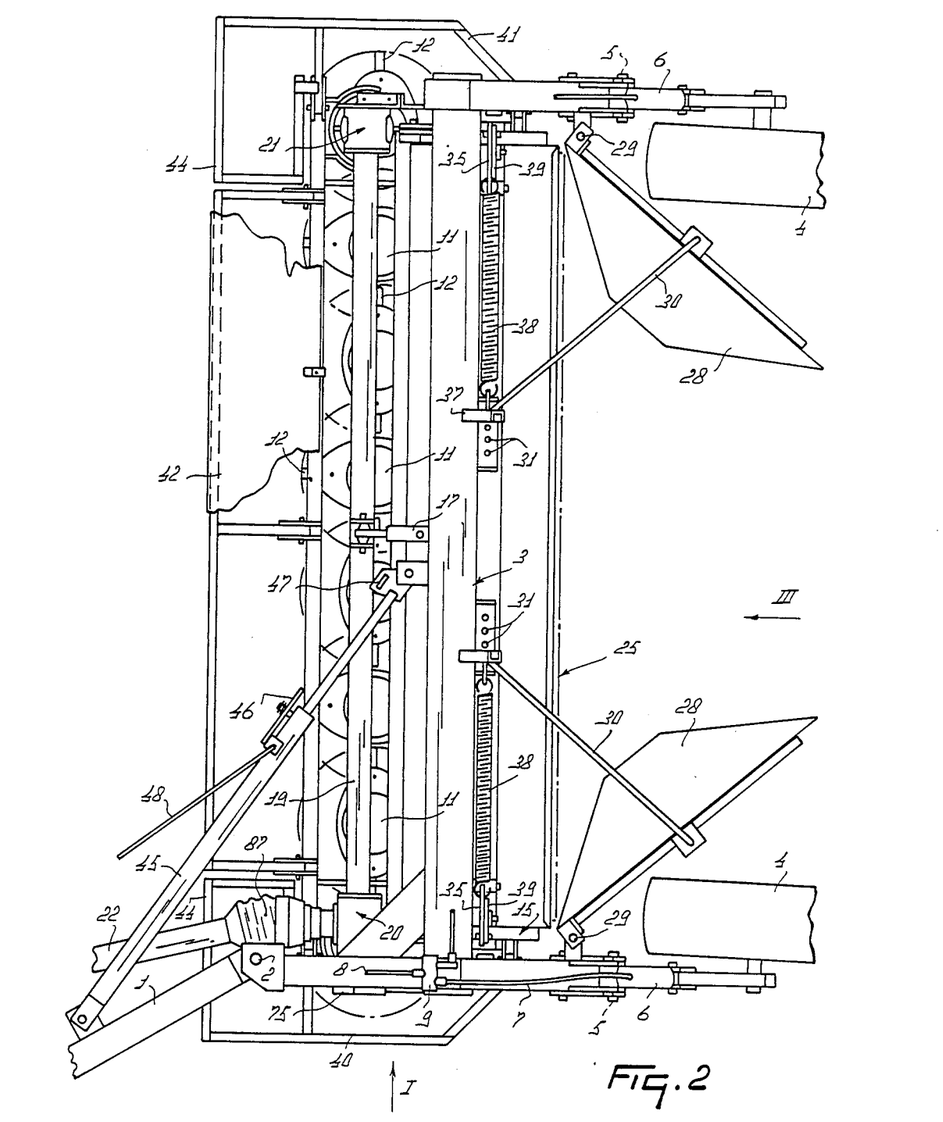
FIG. 2 is a plan view of the mowing machine of FIG. 1.
Figure 3:
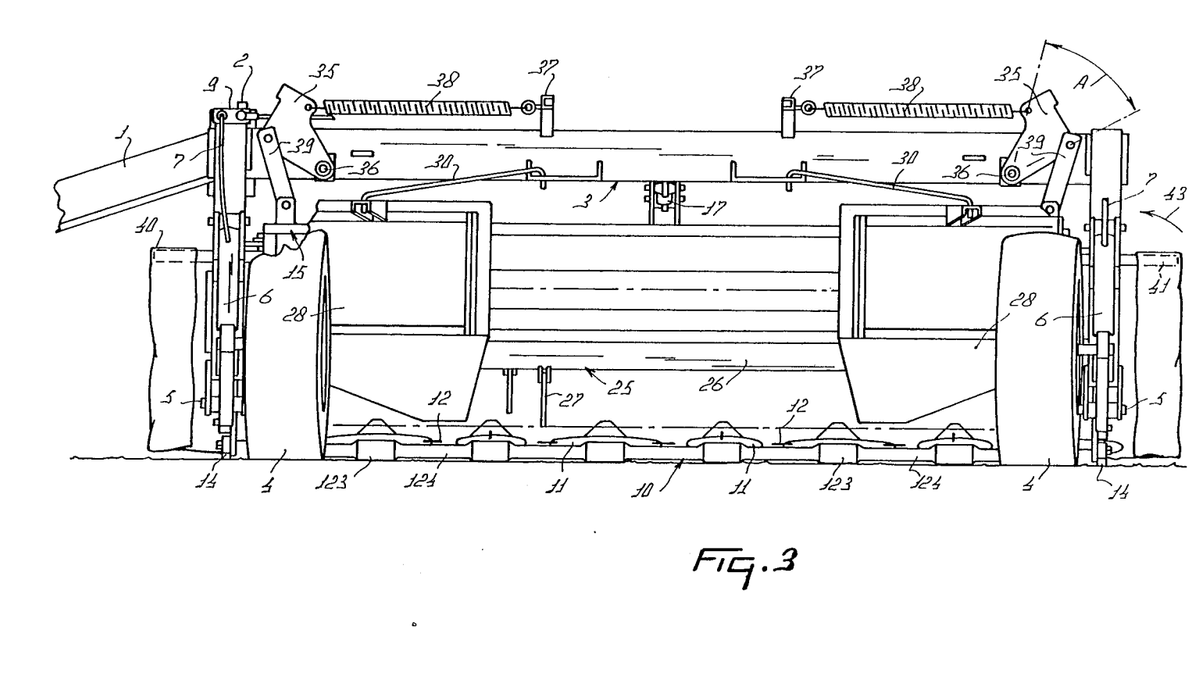
FIG. 3 is a rear view of the mowing machine of FIG. 1.

The embodiment shown in FIGS. 1, 2 and 3 is also provided with a supporting beam 10 together with mower members 11. The mower members 11 are disc-shaped having at their outer periphery knives 12 and are capable of rotation about upwardly directed axes. The drive of the mower members 11 is located in the supporting beam 10. The two outermost mower members are provided with drum-shaped crop guides 13, which rotate along with the mower member.

The supporting beam 10 is connected via arms 14 to the first frame 15. First frame 15, in which are mounted both the mowing unit and the crop processing implement 25 (to be described subsequently), is movably connected to the second frame 3 by means of two lower pivotal members 16 and one upper pivotal member 17. Said pivotal members 16, 17 are mounted pivotally on both the first frame 15 and the second frame 3. The lower pivotal members 16 extend from the second frame 3 obliquely upwardly and forwardly to the first frame 15. As a result thereof, the relative movement of the first frame 15 with respect to the second frame 3 will be such that at least the lower portion of the first frame 15, when it moves upwardly, will also move to the rear relative to the second frame 3. The upper pivotal member 17 is adjustable in length and can be secured to the first frame 15 by means of a plurality of attaching points 18 located one above the other. By changing the length of the upper pivotal member 17 it is possible to change the position of the first frame 15 relative to the second frame 3 and, by connecting the upper pivotal member 17 to a higher or lower attaching point 18 on the first frame 15, it is possible to change the relative movement of the two frames 3, 15 to some extent.

The first frame 15 includes, located within the hollow pipe 19 (FIG. 2), the main drive shaft 53 (FIG. 4) which is provided near its one end with the gear box 21. Inside gear box 20, drive shaft 22, coming from the pulling vehicle, is connected to the main drive shaft located in the hollow pipe 19. The drive will be described in further detail hereinafter with reference to FIG. 4.

The crop processing member 25 accommodated in the first frame 15 substantially consists of a horizontally extending tube 26, to which beater members 27 are fitted. FIG. 3 shows only a few of the beater members 27. The tube 26 with beater members 27 is capable of rotation about its longitudinal axis, i.e. in such a manner that the front side thereof moves upwardly. As a result, the crop mown by the mowing unit is gripped by the beater members 27 which discharge the crop upwardly and rearwardly, resulting in advantageous processing of the crop by the beater members 27.

In order to collect the crop moved rearwardly by the crop processing member 25 into a swath having a smaller width than that of the mowing machine, two swath boards 28 are provided in second frame 3. The swath boards 28 are mounted pivotally about vertical pins 29 (FIG. 2) in the second frame 3. The angle between the swath board 28 and the second frame 3 can be set by connecting the rod 30 in different places to the second frame 3. A plurality of apertures 31 have been provided for the purpose.

As is apparent from FIGS. 2 and 3, the swath boards 28 are provided with a substantially vertical portion and an obliquely downwardly and forwardly curved portion, whereby the crop discharge to the rear by the crop processing member 25 can be guided in an optimum manner into the desired swath.

The suspension of the first frame 15 in the second frame 3 will be described with reference to FIG. 3. At both sides of second frame 3, a tilting element 35 is pivotal about a shaft 36 which extends substantially horizontally and in the direction of operative travel of the machine. A tensile spring 38, compensating for the force exercised by a tensile member 39 on tilting element 35, is arranged between the tilting element 35 and a support 37 mounted on the second frame 3. Tensile member 39, which has one end attached to the tilting element 35, has its other end pivotally connected to the first frame 15. Thus, the laterally directed force exercised by tensile spring 38 is converted into an upwardly directed force exercised on the first frame 15. The positions where the tensile spring 38 and the tensile member 39 act on the tilting element 35 are such that when the tensile spring 38 is extended, the force exercised by the spring 38 increases, the upward force exercised on the first frame 15 does not increase proportionately. This is the result of the use of tilting element 35, which converts the force exercised by the tensile spring 38 into a torque and thereafter converts the torque into a tensile force in tensile member 39. Since on rotation of the tilting element 35 both arms of the torques change, the force also changes so as to keep the torques equal. The tilting element 35 is of such a construction that on extension of the tensile spring 38, whereby the tensile force increases, either the associated arms of the torque exercised thereby on the tilting element 35 decreases, or the arm of the torque by means of which the tilting element 35 exercises a force on the first frame 15 increases. In the embodiment shown in FIG. 3 this results from the fact that the angle between the lines connecting the pivotal point 36 with the points of action of the tensile spring 38 and the tensile member 39, respectively, is less than 90° (indicated in FIG. 3, right-hand side, by the letter A).

In addition, FIGS. 2 and 3 show that the two wheels 4 are slightly out-of-straight relative to the direction of operative travel of the mowing machine. This misalignment of the wheels 4 results in the mowing machine proceeding straight ahead when the vehicle pulling the machine is not directly in front of, rather obliquely to the front of the mowing machine, as shown, e.g. in FIG. 5 to the left front of the mowing machine.

The embodiment illustrated in FIGS. 1, 2 and 3 is also provided with upwardly foldable screening hoods 40, 41 and 42. The screening hood 42 extends across the front side of the mowing machine, the screening hood 41 at the right-hand side and the screening hood 40 at the left-hand side of the mowing machine. The screening hoods are made of a metal frame covered with a plastic-coated cloth or any other type of flexible material which hangs loosely all around. In order to increase the accessiblity of the mowing unit, the screening hoods 40, 41 and 42 are upwardly foldable, i.e. about a substantially horizontal shaft located near the mowing machine. This upward folding movement is shown in FIG. 3 at the right-hand side by means of arrow 43, while in FIG. 1 the folded-up position is indicated by means of broken lines. As is apparent, in particular from FIG. 2, screening hood 42 at the front side of the implement is significantly less in width than is the mowing unit. In addition to the screening hood 42, at the front side of the mowing machine, a further screen is provided by the screening hoods 41 and 42 which, for that purpose, are extended inwardly at the front side. This extension, denoted in FIG. 2 by reference numeral 44, is moved downward when the laterally extending portions of the screening hoods 40 and 41 are folded upwardly. This is of particular importance since at the left-hand side of the mowing machine, the portion 44 of the screening hood 40 is located directly below the drive shaft 22, so that an upward folding movement is impossible.

FIG. 2 further shows a hydraulic cylinder 45 which at its one end is pivotally connected to pivotal arm 1 and at its other end to the second frame 3. By controlling the length of the hydraulic cylinder 45, the pivotal angle of pivotal arm 1 relative to the mowing machine can be set. In the transport position, when the vehicle pulling the machine is approximately directly in front of the mowing machine, the cylinder 45 will be fully retracted, while the locking element 46, consisting of a spring-loaded, rotatable hook, falls into a recess 47 near the end of the piston rod of cylinder 45. Thus, the pivotal arm is released by pulling the rope 48 from the vehicle drawing the machine, whereby the locking element 46 is removed from recess 47. Releasing the lock permits adjustment of the desired angular position of the pivotal arm by operation of the hydraulic cylinder 45.

Figure 4:
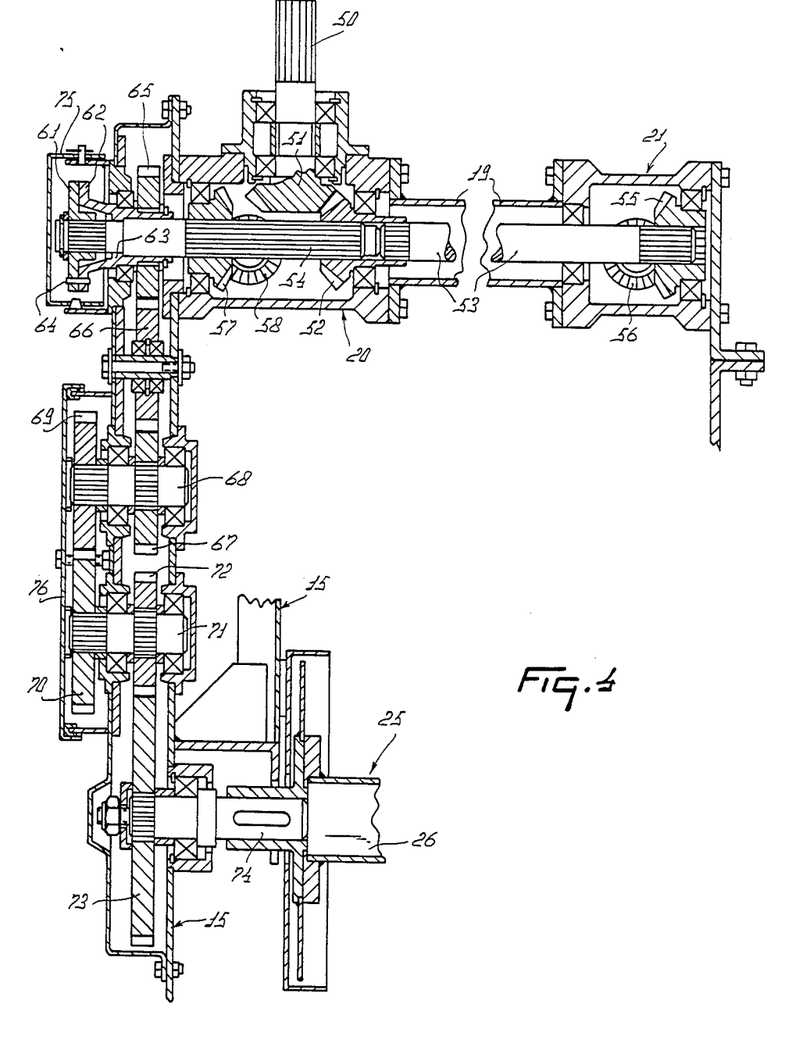
FIG. 4 illustrates the drive of a mowing machine.

The drive of the mowing machine shown in FIGS. 1, 2 and 3 will now be described with reference to FIG. 4. FIG. 4 shows schematically an incoming shaft 50 which is connected to bevel gear wheel 51 in gear box 20. The incoming shaft 50 can be connected to the drive shaft 22 as shown in FIGS. 1 and 2. The bevel gear wheel 51 meshes with bevel gear wheel 52, which is rigidly connected to the main drive shaft consisting of the sections 53 and 54. Section 53 of the main drive shaft 53, 54 goes into gear box 21 and is therein rigidly connected to the bevel gear wheel 55, which meshes with the bevel gear wheel 56 connected to a drive shaft, the other end of which is connected to the outermost mower member 11 near one end of supporting beam 10. Consequently, the outermost mower member 11 is driven via the main drive shaft 53, 54. The other outermost mower element 11 (near the other end of supporting beam 10) is driven via the bevel gear wheel 57, which is secured to the section 54 of the drive shaft 53, 54 and meshes with the bevel gear wheel 58 of a drive shaft connected to the other outermost mower member 11. The two gear boxes 20 and 21 are interconnected by the hollow pipe 19 wherein section 53 of the main drive shaft 53, 54 is accommodated. The hollow pipe 19 constitutes part of the first frame 15. It will be obvious that the rotation of the incoming shaft 50 drives the two outermost mower members 11.

Section 54 of the main drive shaft 53, 54 extends beyond bevel gear 57 and at its end is provided with a rigidly connected flange 61, against which bears a flange 62 which is connected to a sleeve 63 provided coaxially about section 54 of the main drive shaft. The sleeve 63 is rotatable about section 54 of the main drive shaft, which rotation is blocked by a shear pin 64 which inconnects the two flanges 61, 62. The sleeve 63 is also provided with a gear wheel 65, which meshes with gear wheel 66 meshing in turn with gear wheel 67. The gear wheel 67 is connected to a shaft 68, on which a gear wheel 69 is mounted. The gear wheel 69 meshes with a gear wheel 70 mounted on a shaft 71. A gear wheel 72 also mounted on shaft 71 away from gear wheel 70, meshes with a gear wheel 73 which is rigidly mounted on a shaft 74 connected to the crop processing member 25, the tube 26 of which is shown in FIG. 4.

It will be obvious that by rotating incoming shaft 50 not only the mowing unit but also the crop processing member 25 is driven. The shear pin 64 provides protection against excessive forces on the drive, forces which can be produced by blocking the incoming shaft 50 or the mowing unit on the one hand or by blocking the crop processing member 25 on the other. Because of the relatively large mass inerita of both portions of the mowing machine, upon blockage of either of the portions, the remaining portion will be disconnected from the blocked portion by the shearing of the shear pin 64. After shearing, the sheer pin 64 can be replaced by removing the cover 75 located at the side of the mowing machine and fitting a new shear pin.

On one side, the mowing machine is provided with a removable cover 76, behind which the set of gear wheels 69, 70 is located. After removal of the cover 76, both gear wheels can be removed from their respective shafts 68, 71 and be replaced by gear wheels having a different transmission ratio or be interchanged, thereby changing the transmission ratio. Thus, it is possible to alter the transmission ratio between the incoming shaft 50 and the crop processing member 25, with the result the number of revolutions of the crop processing member 25 can be adapted to the desired processing of the crop.

Figures 5, 6:
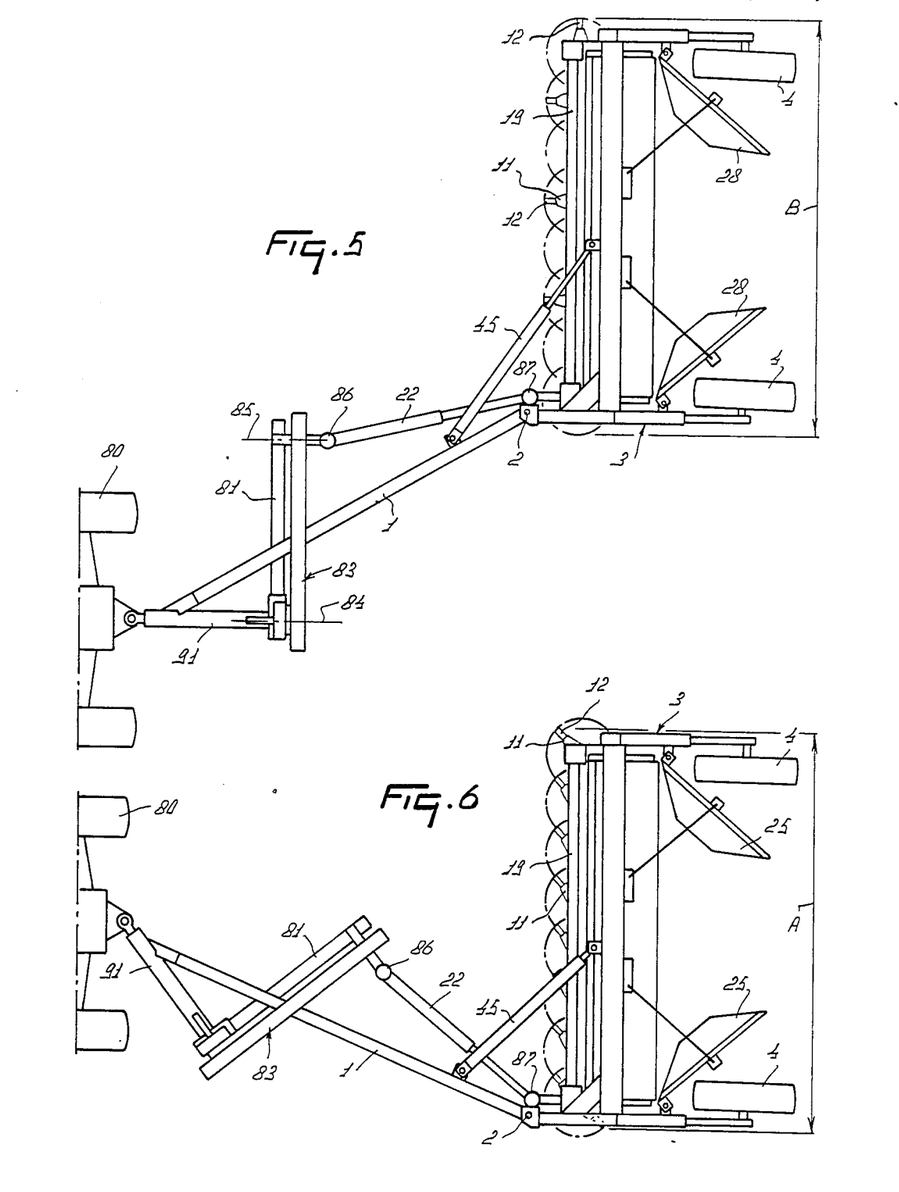
FIGS. 5 and 6 show a first embodiment of the connection between a mowing machine and a vehicle moving the machine.
Figure 7:
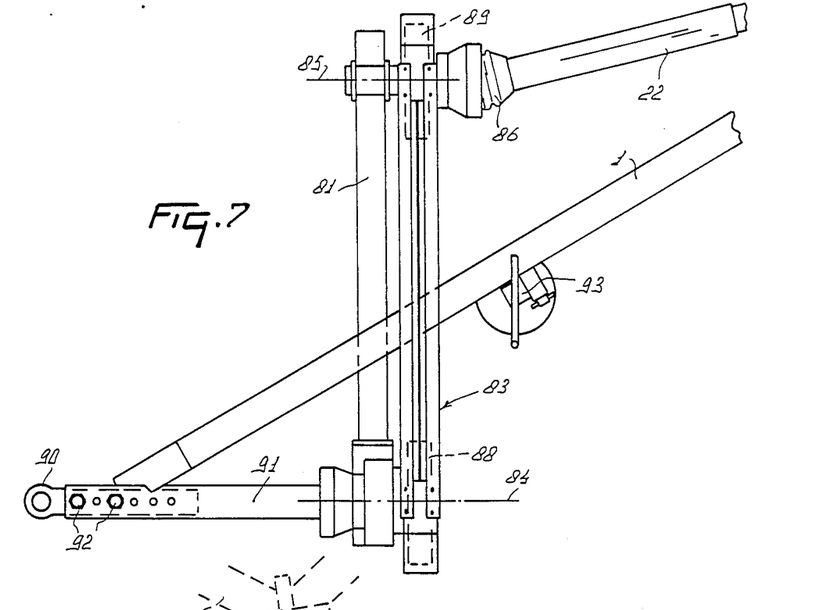
FIG. 7 shows part of the pivotal arm in accordance with the embodiment of FIGS. 5 and 6.

FIGS. 5, 6 and 7 illustrate an embodiment of a pivotal shaft, which permits the mowing implement to be connected to a tractor or a similar vehicle. FIG. 5 shows the position of the prime mover 80 relative to the mowing machine during operation. The mowing machine is then located obliquely behind the prime mover 80. The mowing machine includes the pivotal arm 1 which, as has been described previously, can be fixed in the desired position relative to the mowing machine by means of the hydraulic cylinder 45. A cross-beam 81 is connected to the pivotal arm 1. The cross-beam 81 extends approximately perpendicularly to the direction of operative travel during operation. Connected to the cross-beam 81 is a belt transmission 83. The belt pulleys are indicated with center lines 84 and 85. The secondary belt pulley of the belt transmission 83 is connected by means of a universal joint 86 to the drive shaft 22, which is connected by a universal joint 87 to the incoming shaft 50 of the drive of the mowing machine. The primary belt pulley of the belt transmission 83 is connected to the power take-off shaft of the prime mover 80. The connection is not detailed in the drawings.

FIG. 6 shows the mowing machine in the transport position. The prime mover 80 pulling the machine is approximately directly in front of the mowing machine. In this situation, the hydraulic cylinder 45 is adjusted to its shortest position. FIG. 6 further shows that each of the oval mowing discs 11 can be rotated obliquely forwardly at an angle 45° so as to achieve that the outermost mowing discs or the knives 12 connected thereto do not protude outside the width of the mowing machine, so that the mowing machine width is limited to that legally permitted for transport by public road. By using oval mower members, the working width of the mowing machine can be significantly wider than this legally permitted transport width indicated in FIG. 6 by the letter A. Thus, the permissible transport width can be approximately three meters (FIG. 6), while the working width, B, (FIG. 5) of the same implement can be e.g. 3.16 meters. Of course, it is important that the screening hoods, if used, that extend over the mower members, at least to the extent in which they extend laterally, be folded away to achieve the reduced transport width.

FIG. 7 shows the belt transmission in greater detail. The primary belt pulley 88 and the secondary belt pulley 89 having been indicated by broken lines. Additionally, FIG. 7 shows that lug 90, to be fitted to the prime mover, can be shifted relative to tube 91 and be locked therein in a plurality of positions by means of bolts 92. Also, as seen in FIG. 7, a support 93 can be positioned below the pivotal arm 1 of the mowing machine for use when the mowing machine is disconnected from the prime mover 80.

Figure 8:
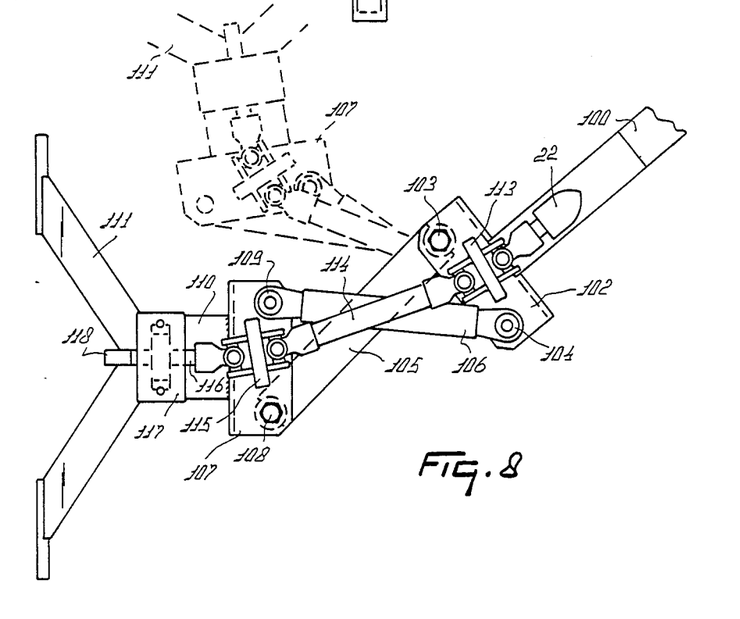
FIGS. 8 and 9 illustrate a second embodiment of the connection between a mowing machine and a vehicle pulling the machine.
Figure 9:
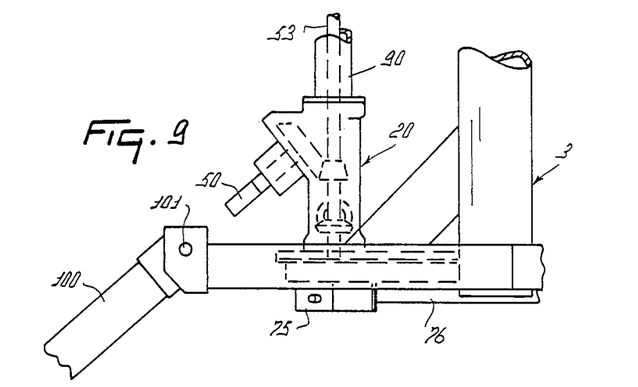
Figure 10:
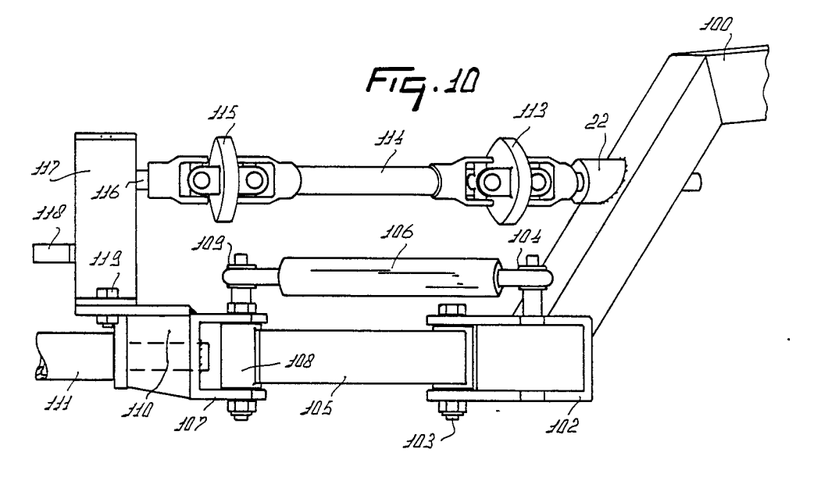
FIG. 10 is a side view of the embodiment shown in FIG. 8.

FIGS. 8, 9 and 10 illustrate a second embodiment for coupling the mowing machine to a prime mover. FIG. 9 shows the manner in which the pivotal arm is connected to the mowing machine, section 100 of pivotal arm being connected pivotally about shaft 101 to second frame 3 of the mowing machine. FIG. 9 shows section 100 of the pivotal arm approximately in its operating position, with section 100 of the pivotal arm extending approximately parallel to the incoming shaft 50 for driving the mowing machine. At the other end of section 100 of the pivotal arm there is provided a cross-beam 102 (FIG. 8) having near each of its ends a pivotal connection 103 and 104, respectively, to the connecting beam 105 and connectiong rod 106 which are both of approximately the same length. The other ends of the connecting beam 105 and the connecting rod 106 are connected pivotally to cross-beam 107 by means of respective pivotal connections 108 and 109 provided near the ends of the cross-beam 107. The cross-beam is rigidly connected by connecting elements 110 and 111 to the vehicle pulling the machine.

It will be obvious that the projections of the pivotal connections 103, 104, 108 and 109 on a horizontal plane form a deformable quadrangle, as is shown in FIG. 8, whose two facing sides, corresponding to the cross-beam 102 and 107, are equal and of constant length. The diagonals, corresponding to the connecting beam 105 and the connecting rod 106, also are equal and of constant length. Broken lines in FIG. 8 illustrate how the cross-beam 107 can move relative to the cross-beam 102 by deformation of said quadrangle. This provides a pivotal connection between the prime mover and the mowing machine, having specific advantages, to be addressed in further detail.

FIG. 10 is a side view of what is shown in FIG. 8. The connection of the connecting beam 105 to each of the cross-beams 102, 107 is such that the construction beam 105 can only pivot in one plane relative to each of the cross-beams 102, 107. In contrast thereto, the pivotal connections 104 and 109 of connecting rod 106 allow for a greater degree of freedom of movement, so that torques transferred by the pivotal arm are passed on by means of connecting beam 105. The pivotal arm is also provided with drive shafts for driving a mowing machine from the prime mover, for which purpose it is possible to connect the drive shaft 22 to the incoming shaft 50 of the mowing machine by means of a universal joint (not shown), while the drive shaft 22 has its other end connected by universal joint 113 to the drive shaft 114, which is connected to the outgoing shaft 116 of a gear box 117 by universal joint 115. In addition, gear box 117 includes the incoming shaft 118 which (not shown) can be coupled to the power take-off shaft of the prime mover.

The above described construction produces an apparent pivotal point, between the prime mover and the pivotal arm to the mowing machine, that is located at some distance behind the prime mover, which is advantageous when negotiating a curve during mowing. The two universal joints 113, 115 each account for approximately half of the angle between the prime mover and the pivotal arm, so that the drive train can also accommodate a comparatively sharp angle of turn. During pivoting of the pivotal arm relative to the prime mover, the length of the drive shaft 114 needs little adaption, particularly when the universal joints 113, 115 are approximately centered on the mean perpendiculars of the constant sides of the deformable quadrangle 103, 104, 108, 109, i.e. at some distance beyond said quadrangle.

The drive also includes a gear box 117 having an incoming shaft 118 and an outgoing shaft 116. This gear box has a transmission ratio of approximately 1.36:1, so that, at a rate of 1,000 revolutions per minute of the power take-off shaft, the rotational speed of drive shafts 114 and 22 is approximately 735 revolutions per minute. The gear box 117 is bolted to connecting element 110 by means of bolts 119. When the mowing implement is drawn by a prime mover having a power take-off that rotates at 540 revolutions per minute, the gear box 117 can be inverted, i.e. it can be secured in the inverted position to the connecting element 110, so that the outgoing shaft 116 and the incoming shaft 118 can be interchanged, thus producing a transmission ratio 0.735:1. Thus, when the power take-off shaft rotates at a speed of 540 revolutions per minute, the result is a rotational speed of approximately 735 revolutions per minute for drive shafts 114 and 22. In this way, the mowing machine can be adapted in a simple way to the prime mover, while rotational speed of the drive train at the pivotal arm is not changed.

Figure 11:
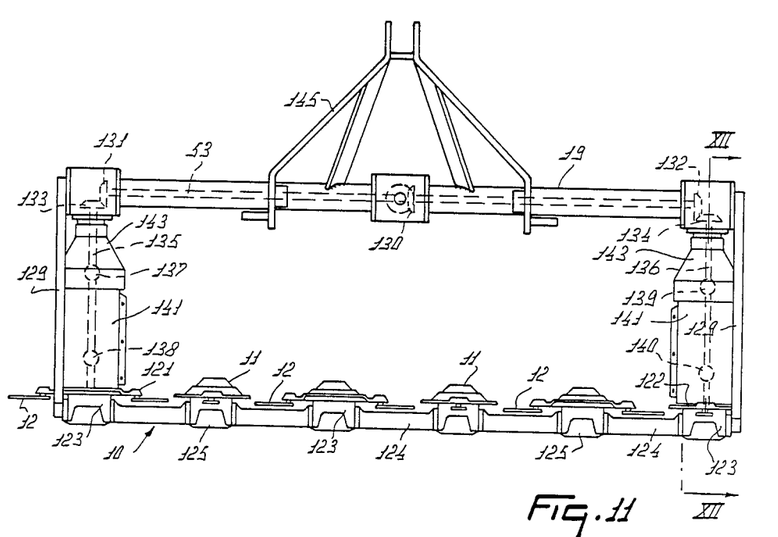
FIG. 11 illustrates an embodiment of the drive of a mowing unit.
Figure 12:
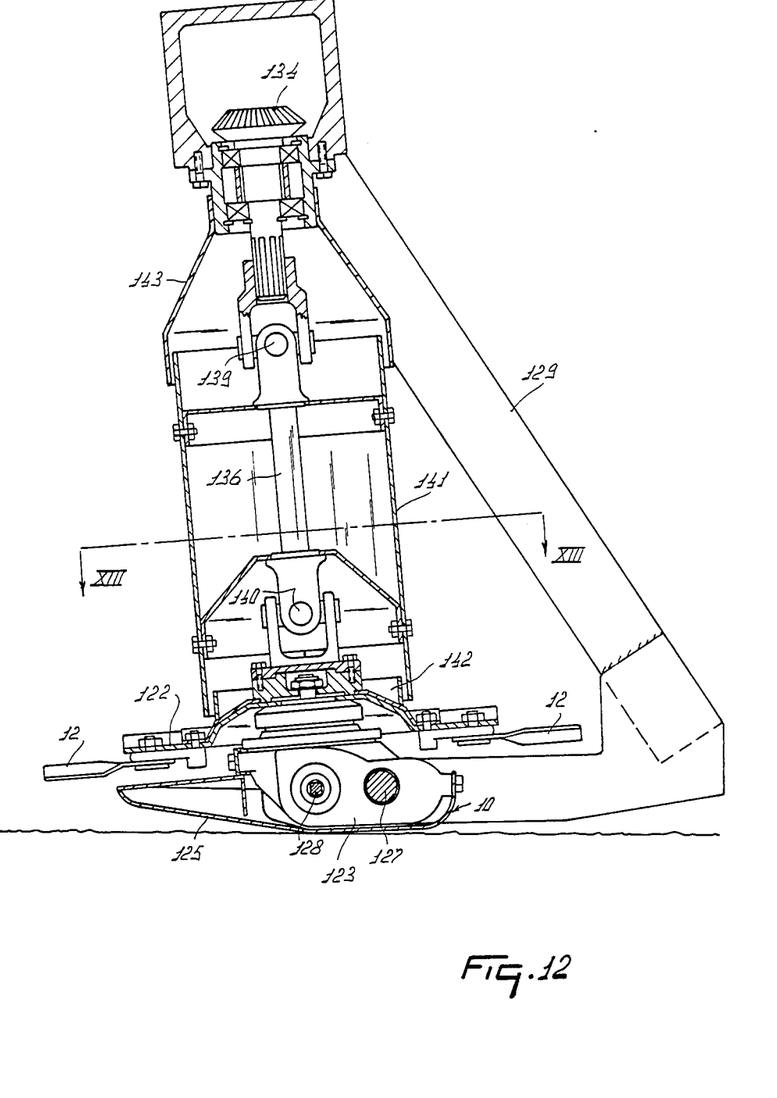
FIGS. 12 and 13 illustrate further details of the embodiment shown in FIG. 11.
Figure 13:
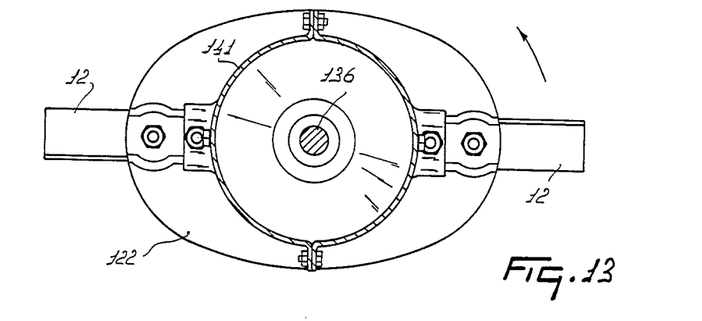

FIGS. 11, 12 and 13 show an embodiment of the mowing machine wherein the outermost mower members 121, 122 are driven. These outermost mower members 121, 122 are mounted on a supporting beam 10, as are the further mowing members 11. The supporting beam 10 is assembled from a plurality of adjacent sections 132, 124, each section 123 having gear wheels for driving the mower member 11 mounted thereon. In addition, the sections 123 are provided at the bottom side with a slide member 125 which slides over the soil. The component sections 123, 124 of the supporting beam are held together by means of a tensile rod 127 (FIG. 12), which is threaded at both ends, so that by tightening nuts screwed thereon a compressive force is exerted on the included sections 123, 124. A torsion shaft 128 (FIG. 12) of, in this embodiment, a square cross-section is provided in the supporting beam 10 parallel to the tensile rod 127. Inside each of the sections 123 of the supporting beam, the torsion shaft 128 extends through a gear wheel which is provided with a correspondingly square center-hole, so rotating the torsion shaft drives the mower members by means of the gear wheels.

The embodiment shown in FIGS. 11 and 12 comprises a frame 129 having a hollow tube 19, with a main drive shaft 53 being located within the hollow tube. The main drive shaft 53 receives its drive from a fitted gear wheel 130. The main drive shaft 53 is fitted near each of its ends with a bevel gear wheel 131, 132 which in turn drive the bevel gear wheels 133, 134 of the respective secondary drive shafts 135 and 136. The secondary drive shafts 135, 136 each have two universal joints 137, 138, 139, 140 through which the two outermost mower members 121, 122 are driven. Since the two outermost mower members 121, 122 are, as are the other mower members 11, drivably interconnected by means of a torsion shaft 128, all the mower members are driven upon rotation of the main drive shaft 53. Drive is provided from both sides of the interconnected series of mower members by the torsion shaft 128, which comprises a flexible drive between each of the mower members. This ensures optimum force distribution between the drives on both sides.

FIG. 12 shows, in further detail, the manner in which secondary drive shaft 136 is connected at one end to the mower member 122 and is provided at the other end with a bevel gear wheel 134 for its drive. Secondary drive shaft 136 is assembled from three sections which are intercoupled by universal joints 139, 140, the joints being single joints in the embodiment shown. In order to guide the mown crop to some extent, the section of secondary drive shaft 136 that is located between the universal joints is fitted with a drum-shaped member 141. Near its lower side, the drum-shaped member 141 is contiguous to an edge 142 attached to the mower member 122, while the drum-shaped member 141 is contiguous near its upper side to a section 143 which is rigidly connected to the frame 129.

In FIG. 11 there is fitted to the frame 129 of the mowing unit a trestle 145, by means of which the mowing unit can be connected to a vehicle. However, the mowing unit shown can also be used in the mowing machine previously described.

Figures 14, 15:
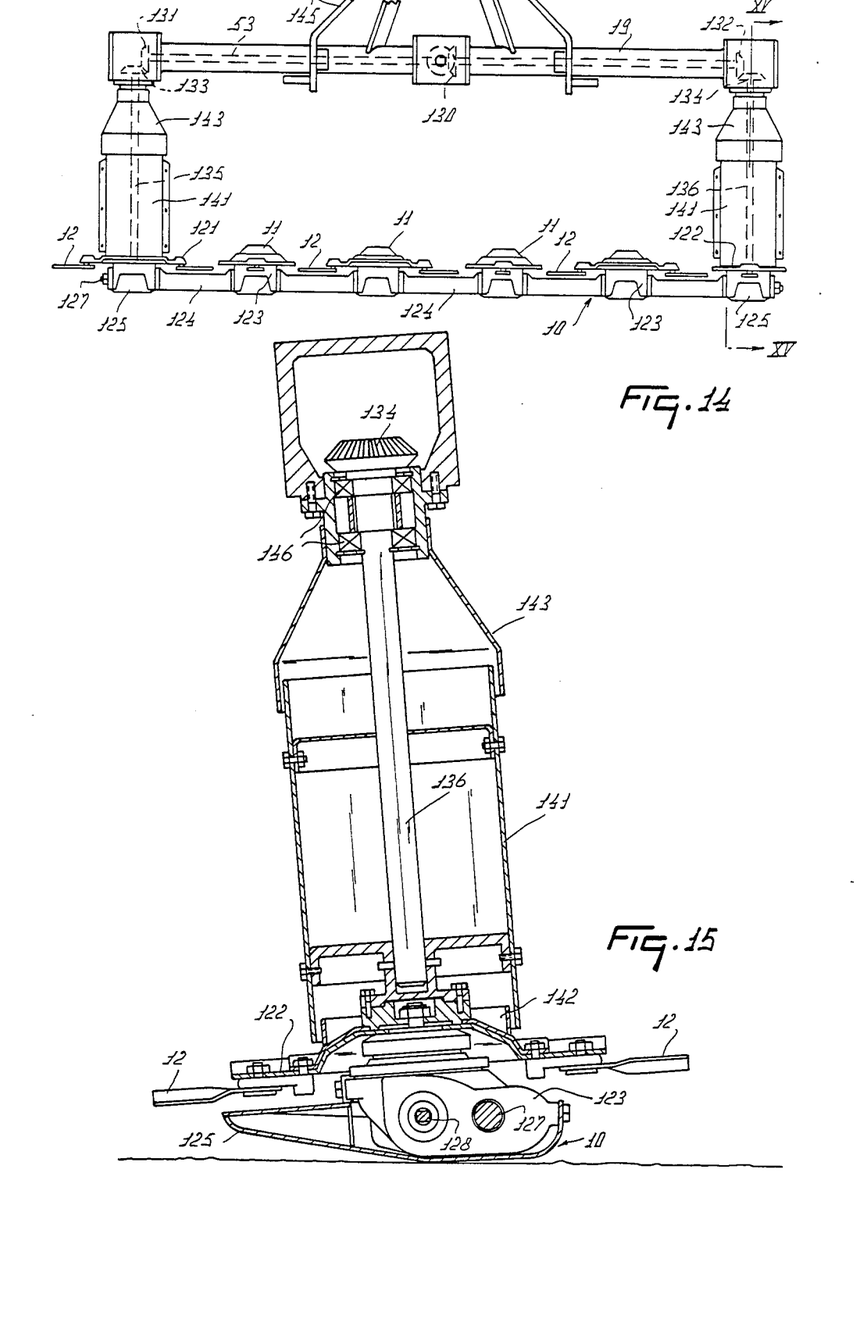
FIG. 14 illustrates another embodiment of the drive of a mowing unit.
FIG. 15 shows a further detail of the embodiment shown in FIG. 14.

FIGS. 14 and 15 show a different embodiment from that shown in FIGS. 11 and 12 in that the secondary drive shafts 135, 136 are not provided with universal joints, while the frame 129 does not provide a connection between the supporting beam 10 and the superjacent frame. The connection is achieved by secondary drive shafts 135, 136, one end of which is bearing-supported in the superjacent frame portion. The bearing is denoted in FIG. 15 by reference number 146. The other end is rigidly connected to the outermost mower members 121, 122. An important advantage of such a construction is that accumulation of crop against stationary frame portions is precluded. The embodiment shown in FIGS. 14 and 15 can also be connected, by means of a trestle 145, to a vehicle, or be accommodated in a mowing machine such as is described, for example, with reference to FIGS. 1, 2 and 3.

The invention is not limited to the features described in the foregoing and claimed in the claims but also comprises any combination of measures as described in the description and as illustrated in the drawings.

Having disclosed our invention, what we claim as new and to be secured by Letters Patent of the United States is:

1. A mowing machine, comprising:
a mobile frame, said mobile frame, during operation, being offset at an oblique angle to the rear and sidewards of a prime mover and further comprising a first frame, said first frame having accommodated therein a mowing unit having a supporting beam and a plurality of mower members, said mower members being rotatable about substantially upwardly directed axes; at least one mower member drive means provided within said supporting beam, said supporting beam during operation extending substantially transversely to the direction of travel; a processing member attached to said first frame such that it is rotatable about a substantially horizontal axis and extends through a large part of the width of said mowing unit; a second frame, connected to the prime mover, in which said first frame is suspended capable of movement such that there is exerted an upwardly directed force on said first frame by a spring which is attached at its one end to said second frame and at its other end to a tilting element also having pivotally attached a tensile member which is also pivotally attached to said first frame, so that, when the spring is tensioned or slackened, an approximately equal upwardly directed force is exerted on said first frame; and a pivotal arm for coupling said mobile frame to the prime mover, said pivotal arm being provided with drive means comprising a coupling means and a driveshaft such that when said pivotal arm moves the mowing machine relative to the prime mover, the length of said drive shaft remains substantially constant.

2. A mowing machine as claimed in claim 1, wherein said pivotal arm is provided with two portions which are movable relative to each other and are interconnected by hinges having substantially vertical pins, the projections of four said hinges on a horizontal plane constituting the vertices of a quadrangle having equal diagonals, said quadrangle being deformable although the diagonals remain constant as do two equal facing sides and said drive means having at least two universal joints, said universal joints being located such that their projections on said plane are located near the respective centers of said equal facing sides.

3. A mowing machine as claimed in claim 1, wherein said projections of the centers of said universal joints are substantially located on the mean perpendiculars of said sides, i.e. each outside the projections of the quandrangle.

4. An implement as claimed in claim 1, wherein said pivotal arm further comprises a section to which said mobile frame is pivotally connected at one end about a vertical pin and at its end facing away from the frame having a transversely extending portion near whose extreme ends there are located two hinges whose projections on a horizontal plane constitute two vertices, interspaced by a fixed distance, of said quadrangle; a connecting element for attachment to the prime mover, said connecting element also having a transversely extending portion, near whose extreme ends are located two hinges whose projections on said horizontal plane constitute the two other vertices, interspaced by a fixed distance, of said quadrangle; and the two said hinges which are located crosswise relative to each other being interconnected by a connecting beam which is capable of pivoting in only one plane relative to said transverse extending portions of pivotal arm and said two other remaining crosswise hinges being interconnected by a connecting rod which is capable of moving in more than one plane relative to each of said sections of said pivotal arm.

5. A mowing machine as claimed in claim 1, wherein said spring is a helical spring.

6. A mowing machine as claimed in claim 5, wherein said helical spring is a tensile spring.

7. A mowing machine as claimed in claim 1, wherein said second frame having fitted thereto swath guides located behind said crop processing member and extending rearwardly and inwardly at an adjustable angle.

8. A mowing machine as claimed in claim 7, wherein each said swath guide further comprises a substantially vertical portion and an obliquely downwardly directed portion.

9. A mowing machine as claimed in claim 1, wherein said second frame further comprises two ground wheels, said ground wheels capable of being lowered relative to said second frame by means of a hydraulic cylinder; and a flow divider being located between a hydraulic supply line common to the two cylinders and said hydraulic cylinders, said flow divider feeding both cylinders with substantially equal quantities of hydraulic fluid, independently of the pressure in each said cylinder.

10. A mowing machine as claimed in claim 9, wherein said first frame is connected to said second frame by a plurality of pivotal members pivotally attached to both said first and said second frame, having at least one lower pivotal member arranged forwardly and obliquely upwardly from said second frame.

11. A mowing machine as claimed in claim 10, wherein at least one superjacent pivotal member is adjustable in length.

12. A mowing machine as claimed in claim 11, wherein the slope of at least one superjacent pivotal member is adjustable, said pivotal member having a plurality of attachment points provided one above the other in either of said frames.

13. A mowing machine as claimed in claim 1, wherein said second frame is connected to the vehicle by means of said pivotal arm, the angle projected in a horizontal plane, between said pivotal arm and said second frame being adjustable by means of a hydraulic cylinder which has one end attached to said pivotal arm and the other end to said second frame.

14. A mowing machine as claimed in claim 13, wherein a belt transmission is attached to said pivotal arm, said belt transmission being located in a substantially horizontal plane extending, during operation, substantially transversely to the direction of operative travel, said belt transmission's incoming drive wheel being connected by means of an intermediate shaft to a bearing provided at the end of said pivotal arm facing away from said mobile frame and the outgoing drive wheel being connected by means of an intermediate shaft to a bearing in the proximity of said mobile frame.

15. A mowing machine as claimed in claim 13, wherein said pivotal arm is pivotal towards a transport position, the end of said pivotal arm facing away from said second frame being located approximately directly, and centered, in front of said second frame, it being possible for said hydraulic cylinder to be locked mechanically by means of a locking element which is operable from the prime mover by means of a rope.

16. A mowing machine as claimed in claim 1, wherein the drive of the mowing machine can be effected from the vehicle by means of a gear transmission having a transmission ratio of approximately 1.36:1, it being possible to alter this gear transmission by interchanging the primary and second gear wheels to obtain a transmission ratio of approximately 0.735:1.

17. A mowing machine as claimed in claim 16, wherein said gear transmission being housed in a gear box which can be mounted in either of two positions, said alternative mounting permitting incoming and outgoing shafts to be interchanged.

18. A mowing machine as claimed in claim 17, wherein said gear transmission is mounted near said end of said pivotal arm facing away from said mobile frame connecting said mobile frame to the prime mover.

19. A mowing machine as claimed in claim 1, wherein said first frame having accommodated therein said mowing unit and said crop processing member, said mowing unit and crop processing member being driven by a drive from the prime mover.

20. A mowing machine as claimed in claim 19, wherein said crop processing member is drivably connected to said mowing unit by means of a shear pin coupling.

21. A moving machine as claimed in claim 20, wherein said drive is provided with a main drive shaft, located above said mowing unit and extending transversely to the direction of operative travel, for driving said mowing unit, said main drive shaft being driven from the prime mover and being provided at one end with a first flange against which a coaxially rotating second flange bears, said second flange being drivably connected to said crop processing member, said first and second flanges being intercoupled by means of said shear pin.

22. A mowing machine as claimed in claim 21, wherein said first and second flanges being intercoupled by said shear pin are accessible at a side of said mobile frame by way of a removable cover.

23. A mowing machine as claimed in claim 21, wherein said crop processing member is driven by means of gear wheels, at least two of which are exchangeable for differently sized gear wheels in order to obtain a different rotational speed of said crop processing member.

24. A mowing machine as claimed in claim 23, wherein said exchangeable gear wheels are provided at the side of said crop processing member and are covered by a removable cover.

25. A mowing machine as claimed in claim 1, further comprising a screening means extending forwardly and laterally from the mowing machine, said means include screening hoods which can be folded upwardly by means of hinges about a horizontal shaft located near the mowing machine; and at least on the side of the mowing machine having the incoming drive, having connected a laterally extending screening hood attached to a portion of said forwardly extending screening means, so that, when said laterally extending screening hood is folded upwardly about a substantially horizontal shaft extending in the direction of operative travel, said lateral portion of said screening hood present in front of the mowing machine is folded downwardly.

26. A mowing machine as claimed in claim 1, wherein said supporting beam of said moving unit further comprises substantially oval mower members rotatably mounted thereon, said mower members being provided with two knives, adjacent said mower members rotating in opposite directions, as do the outermost mower members, i.e., from the front side inwardly to the rear, and the outside dimension of the said mowing unit, when all said mower members are directed such that the long axes of said oval mowing members are directed forwardly and laterally at an angle of approximately 45°, being approximately three meters.

27. A mowing machine as claimed in claim 1, wherein said mowing unit includes said supporting beam connected to said mobile frame by means of two shafts, each said shaft attached to a mower member and rotating along therewith, and at least one of said shafts driving said mower members.

28. A mowing machine as claimed in claim 27, wherein said two shafts drive the two outermost said mower members.

29. A mowing machine as claimed in claim 28, wherein all of said mower members are interconnected by means of a torsion shaft located in said supporting beam and extending substantially through the entire length thereof, said torsion shaft, for the drive of each said mower member, being provided with a gear wheel located below said relevant mower member in said supporting beam.

30. A mowing machine as claimed in claim 29, wherein said torsion shaft has an out-of-round cross-section and said gear wheels are provided with a center-hole having a complementary out-of-round shape.

31. A mowing machine as claimed in claim 30, wherein said torsion shaft can be removed from said supporting beam by axial displacement.

32. A mowing machine as claimed in claim 31, wherein said supporting beam is assembled from sections arranged next to and against each other in the longitudinal direction of said supporting beam, at least two of said sections including drive units for said mower members.

33. A mowing machine as claimed in claim 32, wherein said sections are held together by means of a tensile rod passing therethrough.

34. A mowing machine as claimed in claim 33, wherein said tensile rod and said torsion shaft extending parallel thereto, extend through the said supporting beam sections, are slidably removable by sliding same in the longitudinal direction of said supporting beam, so that said sections of said supporting beam are detachable and separately replaceable.

* * * * *